United States Patent [19]

Saito et al.

[11] Patent Number: 4,780,395
[45] Date of Patent: Oct. 25, 1988

[54] MICROCHANNEL PLATE AND A METHOD FOR MANUFACTURING THE SAME

[75] Inventors: Tamio Saito, Tokyo; Tadashi Sekiguchi, Tochigi, both of Japan

[73] Assignee: Kabushiki Kaisha Toshiba, Kawasaki, Japan

[21] Appl. No.: 7,087

[22] Filed: Jan. 27, 1987

[30] Foreign Application Priority Data

Jan. 25, 1986 [JP] Japan ................................ 61-14185
Jun. 3, 1986 [JP] Japan ............................... 61-128477

[51] Int. Cl.⁴ ........................... G03C 5/00; H01J 43/00
[52] U.S. Cl. .................................... 430/315; 430/319; 430/320; 430/329; 430/330; 430/394; 313/103 R; 313/103 CM
[58] Field of Search ............... 430/315, 319, 321, 329, 430/330, 320, 324, 313, 394; 445/46–51; 313/103 R, 103, 103 CM, 104, 105 CM, 105, 105 R

[56] References Cited

U.S. PATENT DOCUMENTS

| 3,976,905 | 8/1976 | Seidman et al. ............. 313/103 CM |
| 3,979,621 | 9/1976 | Yates .......................... 313/103 CM |
| 4,153,855 | 5/1979 | Feingold ..................... 313/105 CM |
| 4,268,537 | 5/1981 | Goodman ........................... 430/329 |
| 4,326,929 | 4/1982 | Minezaki et al. .................... 430/315 |
| 4,342,821 | 8/1982 | Galves et al. ...................... 430/321 |

Primary Examiner—John E. Kittle
Assistant Examiner—Donald J. Loney
Attorney, Agent, or Firm—Oblon, Fisher, Spivak, McClelland & Maier

[57] ABSTRACT

A microchannel plate has a platelike photosensitive glass substrate and a plurality of microchannels formed separately from each other and extending across the thickness of the substrate. A secondary electron-emission surface is formed on an inner surface of each of the microchannels. Accelerating electrodes formed on two opposite sides of the photosensitive glass substrate, so as to be partially in electrical contact with the secondary-emission surface. The microchannels are formed by applying ultraviolet rays to the substrate through a mask and removing irradiated portions of the substrate by etching.

4 Claims, 4 Drawing Sheets

MICROCHANNEL PLATE AND A METHOD FOR MANUFACTURING THE SAME

BACKGROUND OF THE INVENTION

1. Field of the Invention

The present invention relates to a microchannel plate, as one of secondary-electron multiplying means, and a method for manufacturing the same.

2. Description of the Prior Art

Microchannel plates, having fine perforations called microchannels, are used for secondary electron multiplication.

FIG. 1 shows an image intensifying system using a microchannel plate. As shown in FIG. 1, photoelectrons 3 emitted from photocathode 2, excited by incident light 1, are accelerated by voltage E1, applied between cathode 2 and first accelerating electrode 6a of microchannel plate 4, and are then projected diagonally on microchannels 5.

A secondary-electron emission surface is formed inside microchannels 5. Secondary electrons emitted from the emission surface are accelerated by voltage E2, applied between first and second electrodes 6a and 6b on two opposite sides of microchannel plate 4. Then, the electrons repeat collisions inside each microchannel, as shown in FIG. 2. Multiplied secondary electrons 7, delivered from plate 4 in this manner, are projected on anode-cum-fluorescent screen 8 by voltage E3, thus forming a visible image.

Prior art microchannel plates generally comprise a bundle of capillary glass tubes, for use as microchannels, each having an inside diameter of about 15 μm and length of about 1.5 mm. A secondary-electron emission surface made of PbO is formed on the inner surface of each capillary tube.

These conventional microchannel plates are manufactured as follows. First, cylindrical glass bodies to be used as capillary tubes, each having a core therein, are each heated and extended into individual elongate bodies. Then, a number of such elongate bodies are bundled and fused together. After they are heated and extended again, the elongate bodies are fused to be united in an integrated body. The resultant integral structure is sliced and ground, and the core portion is removed by etching. PbO is formed on the inner surface of each capillary tube by heat treatment. Thereafter, accelerating electrodes are formed by vacuum evaporation.

According to this manufacturing method, the unification of the individual capillary tubes, as well as the formation thereof, requires complicated processes. Thus, the conventional method is low in productivity, and entails high cost. Moreover, a great number of capillary tubes must be provided for microchannel plates of a wide area, resulting in lower productivity. Since the way of bundling the capillary tubes is subject to restriction, furthermore, the microchannel plates cannot readily be varied in shape.

Thus, the prior art microchannel plates require sophisticated manufacturing processes, and can hardly enjoy a wide-area configuration or variation in shape.

SUMMARY OF THE INVENTION

The object of the present invention is to provide a microchannel plate which can settle these problems of the prior art, and can readily enjoy a wide-area configuration and varied shapes, requiring only simple manufacturing processes.

A microchannel plate according to the invention has a platelike photosensitive glass substrate in which a plurality of microchannels are formed separately from each other and extending in the direction of the thickness of the substrate, a secondary electron-emission surface formed on an inner surface of each of the microchannels, and accelerating electrodes formed on two opposite sides of the substrate, so as to be partially in electrical contact with the secondary electron-emission surface.

According to the present invention, moreover, the microchannel plate of the above construction is manufactured in accordance with the following processes. First, a platelike photosensitive glass substrate is provided, which crystallizes when exposed to ultraviolet rays. Ultraviolet rays are applied to the substrate through a mask which has a plurality of light-transmitting portions. Irradiated portions of the substrate are removed by etching, thereby forming a plurality of microchannels, extending in the direction of the thickness of the substrate. Thereafter, a secondary electron-emission surface is formed on an inner surface of each of microchannels. Finally, an accelerating electrode is formed, by the lift-off method, on each side of the photosensitive glass base so as to be in electrical contact with the secondary electron-emission surface.

DETAILED DESCRIPTION OF THE PREFERRED EMBODIMENTS

Figure 3:
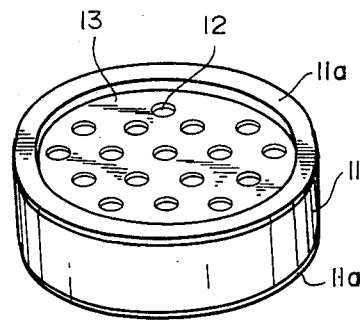
FIG. 3 is a perspective view showing an outline of a microchannel plate according to an embodiment of the present invention.

FIG. 3 is a perspective view showing an outline of a microchannel plate according to an embodiment of the present invention. As shown in FIG. 3, microchannels 12, consisting of a number of small perforations, are bored through photosensitive glass substrate 11 in the form of a disk plate. A secondary electron-emission surface is formed on an inner surface of each microchannel 12. Accelerating electrode 13 is formed on each side of substrate 11. It is in electrical contact with the secondary electron-emission surface.

Microchannels 12 extend aslant the plane of photosensitive glass substrate 11, so that electrons, incident vertically on substrate 11, can strike against the secondary electron-emission surface, as they pass through microchannels 12, and that resultant secondary electrons can repeatedly run against the emission surface many times.

Peripheral edge portion 11a on each side of photosensitive glass substrate 11 projects to a height of one to several micrometers. When a plurality of microchannel plates are stacked, edge portions 11a serve to keep gaps of several micrometers between the stacked plates. Thus, the secondary electrons can be delivered successively to subsequent microchannel plates, without requiring precise alignment between the microchannels of the plates.

Referring now to FIGS. 4A to 4J, a method for manufacturing the microchannel plate according to the present invention will be described.

Figure 4A:
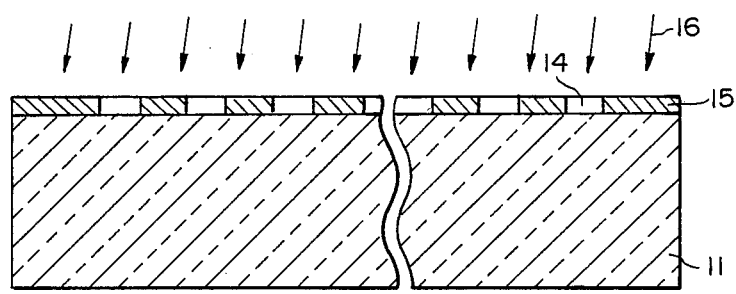
FIGS. 4A to 4J are sectional views for illustrating a method for manufacturing the microchannel plate according to the present invention.

First, mask 15 of metal, such as chromium, or emulsion mask, having a number fine perforations 14 of transparent portions, is provided on one side of photosensitive glass substrate 11 in the form of a disk, as shown in FIG. 4A. Collimated ultraviolet rays 16 are applied diagonally to the surface of substrate 11 through mask 15. Substrate 11 is of a conventional type, formed of an amorphous material which changes into a crystalline form when exposed to ultraviolet rays. This material is known to the art and is available from Corning Corp. In the irradiation process, therefore, those regions of substrate 11 which are exposed to rays 16, to form microchannels 12, are crystallized.

Figure 4B:
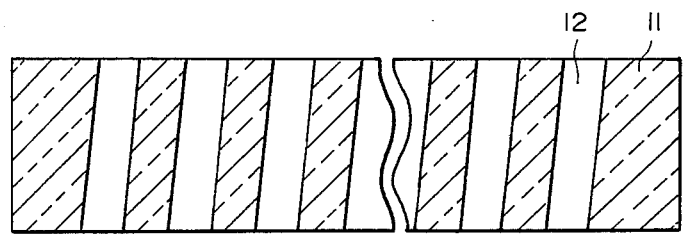

Photosensitive glass substrate 11, exposed selectively to ultraviolet rays 16 in this manner, are subjected to chemical etching using a chemical etchant containing hydrofluoric acid, whereby the irradiated regions are removed from substrate 11. As a result, perforations or microchannels 12, having a diameter of, e.g., about 15 μm, are bored through substrate 11, as shown in FIG. 4B. Microchannels 12 extend aslant the plane of substrate 11.

Figure 4C:
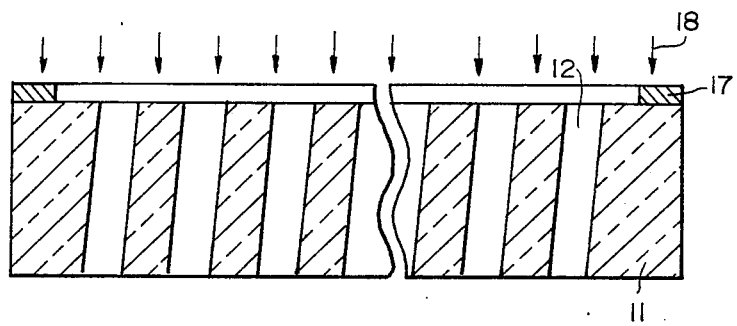
Figure 4D:
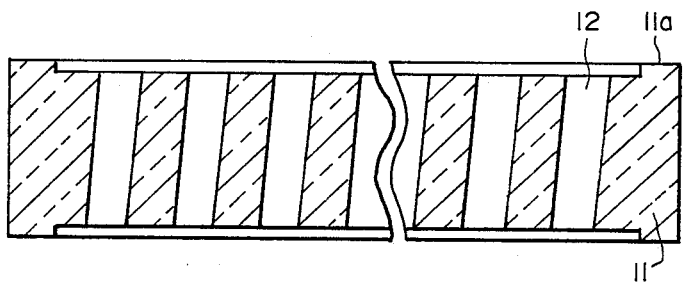

Subsequently, ring-shaped mask 17, made of the same material as mask 15 used in the process of FIG. 4A, is placed on the one side of glass substrate 11, as shown in FIG. 4C. Then, collimated ultraviolet rays 18 are applied at right angles to the surface of substrate 11 through mask 17. Thereafter, substrate 11 is subjected again to chemical etching, so that only those surface-layer portions exposed to rays 18 are removed from substrate 11. To attain this, the ultraviolet irradiation time or etching time must be made shorter than in the process for forming microchannels 12. The same processes as aforesaid are repeated for the other side of substrate 11. As a result, the whole surface region on each side of base 11, except peripheral edge portion 11a, is removed, thus leaving a depression of a predetermined depth, as shown in FIG. 4D. By contrast with the depression, edge portion 11a is projected.

Figure 4E:
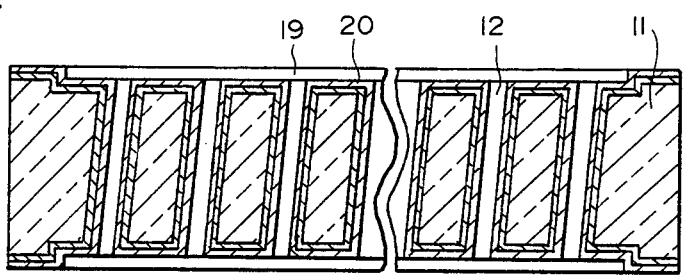

In order to form the secondary electron-emission surface inside microchannels 12, thereafter, the surface of photosensitive glass substrate 11 is first degreased to remove organic matter thereon. Then, copper film 19 is formed over the whole surface of substrate 11 including the inner surfaces of microchannels 12 by electroless-plating, and lead film 20 is formed on film 19 by electroplating, as shown in FIG. 4E.

The electroless-plating, for the formation of copper film 19, is performed as follows. Photosensitive glass substrate 11 is immersed in a solution of $SnCl_2$ for sensitization, and then in a $PdCl_2$ solution, to have its surface activated. For the surface activation, substrate 11 may alternatively be immersed in a mixed colloidal solution of $PbCl_2$ and $PdC_2$. Then, after it is washed with water, substrate 11 is immersed in an electroless-plating solution. As a result, copper film 19 with a thickness of several micrometers is formed on the surface of substrate 11. The plating solution, used for this purpose, may be a mixed solution of copper sulfate, formalin, sodium hydroxide, nickel chloride, Rochelle salt, EDTA, triethanolamine, thiourea, and/or 2-mercaptobenzothiazole. The last six ingredients are not essential, and the composition of the solution can be changed as required.

The electroplating, for the formation of lead film 20, is performed as follows. An electrode is attached to copper film 19, and is connected to one terminal of a DC power source. A lead plate is connected to the other terminal of the power source. Then, substrate 11 and the lead plate are immersed in a plating solution in a lead borofluoride bath or lead sulfamate bath, and are supplied with electric current from the DC power source. As a result, lead film 20 with a thickness of several micrometers is formed on copper film 19.

Then, substrate 11, with copper film 19 and lead film 20 thereon, is heated at, e.g., 400° C. or more in an oxygen atmosphere for oxidation, so that films 19 and 20 are changed into $Cu_2O$ film 21 and PbO film 22, respectively Film 22 constitutes secondary electron-emission surface 23.

Figure 4F:
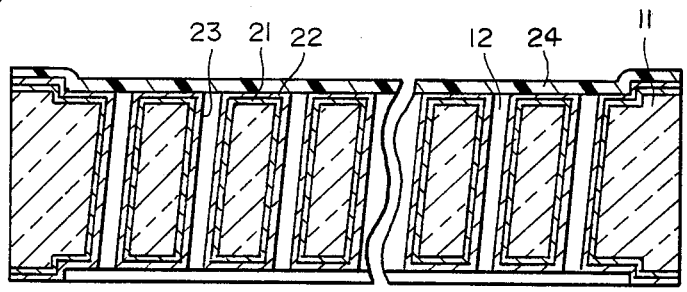
Figure 4G:
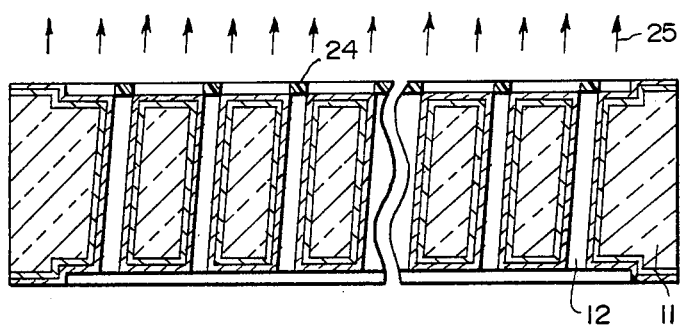

Subsequently, accelerating electrode 13 is formed by the lift-off method. Photoresist (negative) 24 is applied to the one side of substrate 11, to a thickness of several micrometers, as shown in FIG. 4F. Then, light rays 25 are applied from the other side of substrate 11 to resist 24, through microchannels 12, for exposure. Thereafter, resist 24 is developed. As a result, the resist remains only over microchannels 12, just like lids covering the microchannels, as shown in FIG. 4G.

Figure 4H:
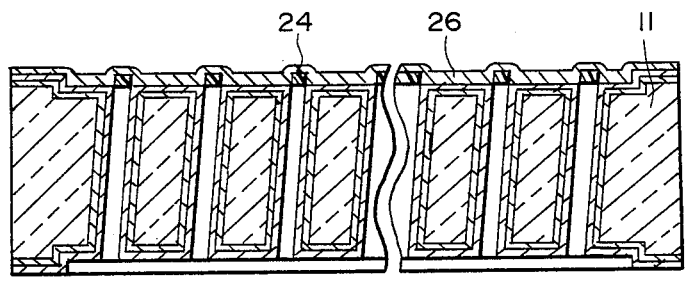
Figure 4I:
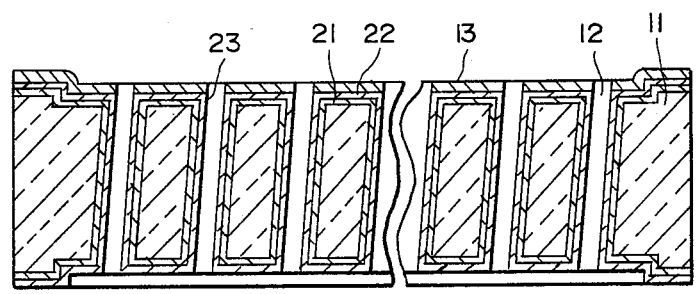

Then, metal film 26, e.g., an Fe-Cr or Cr-Ni film, is deposited on that side of photosensitive glass substrate 11 with resist 24 thereon, by vacuum evaporation, as shown in FIG. 4H. Film 26 serves as accelerating electrode 13. The whole resultant structure is immersed in a resist stripping solution, to remove resist 24 and those portions of film 26 thereon. As a result, the whole metal film except those portions over microchannels 12 remain on substrate 11, thus constituting electrode 13, as shown in FIG. 4I.

Figure 4J:
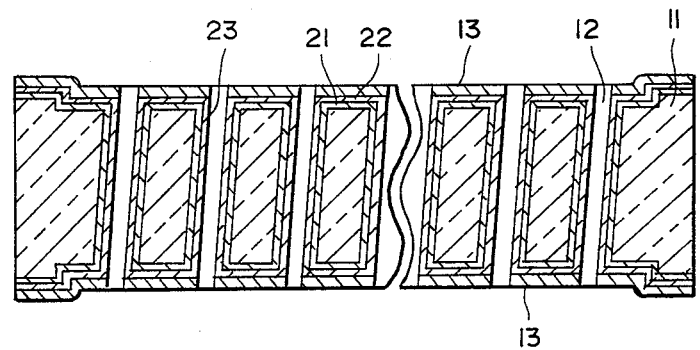

Accelerating electrode 13 is formed also on the other side of glass substrate 11, as shown in FIG. 4J, by repeating the same processes of FIGS. 4A to 4I, with substrate 11 overturned. Thus, the microchannel plate, as shown in FIG. 3, is completed.

Figure 1:
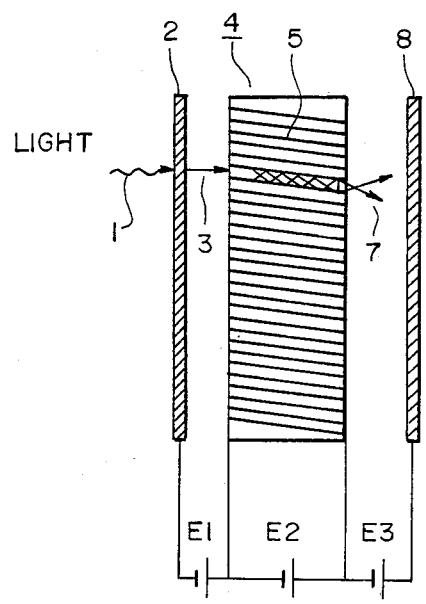
FIG. 1 is a schematic view showing an image intensifying system using a microchannel plate.
Figure 2:
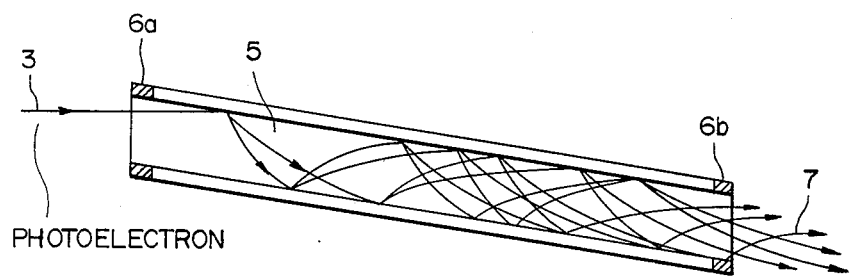
FIG. 2 is a diagram for illustrating the principle of secondary-electron multiplication of the microchannel plate.

An image intensifying system can be constructed by combining photocathode 2 and anode 8 acting also as a fluorescent screen with the microchannel plate, as shown in FIG. 1.

In the microchannel plate according to the invention, a plurality of microchannels are formed in one and the same photosensitive glass substrate, thus permitting an integral construction. Therefore, the manufacture of the microchannel plate requires neither a process for forming capillary tubes for use as individual microchannels, nor a process for uniting the tubes in a body. Thus, according to the manufacturing processes for the microchannel plate of the invention, a number of microchannels are formed simultaneously by applying ultraviolet rays to the substrate through the mask, and then removing the irradiated portions by etching. Also, the secondary electron-emission surface can be formed at a time for all the microchannels, by plating with metal film or by oxidation. Since the accelerating electrodes are formed by the lift-off method, moreover, their material cannot spoil the secondary electron-emission surface by sticking to the inside of the microchannels.

According to the present invention, secondary electron-emission surface 23 is not limited to the aforementioned two-layer structure which includes the PbO and Cu₂O films. It is necessary only that surface 23 be able to be attached to photosensitive glass substrat 11 and capable of secondary electron-emission. The material of accelerating electrode 13 is not limited to the aforesaid one.

In the embodiment described above, moreover, photosensitive glass substrate 11 or the microchannel plate has a circular external shape. Alternatively, however, it may be of any suitable shapes, such as square, rectangular, and polygonal shapes, depending on the applications. With use of various masks, microchannels of different diameters, different opening ratios, or varied shapes, such as circular and square configurations, may be formed. Also, the inclination of microchannels 12, relative to the plane of substrate 11, can be changed by varying the irradiation angle of ultraviolet rays 16, in the exposure process of FIG. 4A.

It is to be understood that the present invention is not limited to the embodiment described above, and that various changes and modifications may be effected therein by one skilled in the art without departing from the scope or spirit of the invention.

According to the present invention, a microchannel plate having a number of microchannels can be manufactured at low cost, by simple processes. Since the photosensitive glass base is not restricted in shape and size, the microchannel plate can have a wide area and various configurations. Also, the microchannels may enjoy various shapes, dimensions, and inclinations, depending on the type of the exposure mask, used in the manufacturing processes, and the angle of irradiation.

What is claimed is:

1. A method for manufacturing a microchannel plate, comprising the steps of:

applying ultraviolet rays to a platelike photosensitive glass substrate through a mask having a plurality of light-transmitting portions, said substrate being formed of a material capable of being crystallized when exposed to ultraviolet rays;

removing irradiated portions of the substrate by etching, thereby forming a plurality of microchannels extending across the thickness of the substrate;

forming a secondary electron-emission surface on an inner surface of each of the microchannels; and forming an accelerating electrode on each side of the photosensitive glass substrate so as to be in electrical contact with the secondary electron-emission surface, by the negative photoresist lift-off method.

2. The method according to claim 1, wherein said step for forming the secondary-emission surface includes forming a copper film on both the opposite sides of the photosensitive glass substrate and inside the microchannels, by electroless-plating; forming a lead film on the copper film by electroplating; and oxidizing the copper and lead films, thereby providing the secondary electron-emission surface.

3. The method according to claim 2, wherein said copper and lead films are oxidized by being heated in an oxygen atmosphere.

4. The method according to claim 1, wherein the accelerating electrodes on each side of said photosensitive glass substrate are formed separately, one side at a time by first forming a negative resist on one side of the photosensitive glass substrate; exposing the resist from the other side of the substrate, through the microchannels; developing the resist thereby leaving resist portions individually over the microchannels; depositing a metal film, which forms an accelarating electrode on one side of the substrate; and removing the resist portions and those portions of the metal film thereon.

* * * * *